Oct. 19, 1971 E. M. WALLACE 3,613,240
SHEARS

Filed July 30, 1969 2 Sheets-Sheet 1

INVENTOR.
EDWARD M. WALLACE
BY Kenwood Ross &
Chester E. Flavin
ATTORNEYS.

Oct. 19, 1971 E. M. WALLACE 3,613,240
SHEARS

Filed July 30, 1969 2 Sheets-Sheet 2

INVENTOR.
EDWARD M. WALLACE
BY Kenwood Ross &
Chester E. Flavin
ATTORNEYS.

United States Patent Office 3,613,240
Patented Oct. 19, 1971

3,613,240
SHEARS
Edward M. Wallace, Longmeadow, Mass., assignor to Wallace Mfg. Corp., Thompsonville, Conn.
Filed July 30, 1969, Ser. No. 846,055
Int. Cl. B26b 13/26
U.S. Cl. 30—248
3 Claims

ABSTRACT OF THE DISCLOSURE

A shears or cutting device having a movable blade disposed in a horizontal plane vertically below the plane of the stationary blade, with the shears-closing movement being through a pulling force exerted, via a pull rod, on the movable blade to cause the movable blade to be rotated horizontally and vertically toward the stationary blade into a positive cutting engagement with the cutting edge of the stationary blade, the means for achieving the pulling force being pivotally interengaged with the movable blade at a point in spaced relationship with and vertically upwardly of the general plane of the movable blade.

---

The present invention relates to improvements in shears or like cutting tools such as, for example, grass shears as used in grass cutting or clipping or trimming operations.

The grass shears comprises an improvement in the art as heretofore known, which art is generally related to complicated mechanisms for mounting a movable blade with respect to a fixed blade and imparting movement thereto through the handles of the shears.

Generally, in shears of the type contemplated, the movable blade is disposed in a horizontal plane above the horizontal plane of the stationary blade and is pushed in the cutting operation. One outstanding disadvantage of most conventional shears is that there is a great tendency for the cutting edges of the blades to separate when they are brought together in contact with the materials to be cut and to be clogged with uncut material, therefore not forming a clean cut or shearing action. While attempts have been made to overcome this tendency, and to bring the blades close together when brought into contact with the material being cut, these attempts have not generally met with success and in most instances have resulted in complicated and expensive constructions.

The salient feature of the shears hereof is that the movable blade is motivated in the cutting operation with an improved shearing force between the cutting edges of the movable and stationary blades, and hence a smooth and easy and efficient cutting action, as compared with known prior art shears.

The principal novelty resides in the specific mounting of a movable blade on a fixed blade and handle unitary therewith and the positioning of the means by which a movable handle and a movable blade are operatively interconnected so that a vertical movement of the movable handle imparts a horizontal movement to the blade through a simple pull rod connection in spaced parallelism with the stationary blade and precludes the sideward tilting of the movable blade which otherwise results.

The movable blade, pivotally connected to the stationary blade, is disposed in a plane vertically below the plane of the stationary blade. The blades are brought into closed or cutting relationship by a pulling force, as contrasted with the more normal pushing force, which pulling force is applied to the movable blade. In the cutting operation, the cutting edge of the movable blade is pulled in two planes (horizontally and vertically) into positive cutting engagement with the cutting edge of the stationary blade.

By applying a pulling force to the movable blade, the result is that the action of the cutting edge of the movable blade is positively against the stationary blade, with any separating tendency being obviated so as to improve the cutting and shearing efficiency.

The invention provides a device having novel means for pivotally mounting one of the blades thereof on a handle extension arranged to effect a positive shearing movement of said blade during its operation relative to the other blade.

The invention provides shears in which the blades are held in positive effective shearing contact during their entire shearing movement.

The invention provides shears in which the operating means for the blades are so constructed as to prevent separation of the blades by the material or object during the cutting action of the device.

The invention provides shears having a more positive controlled cutting action over similar devices of the prior art.

The invention provides shears of an improved construction which can be inexpensively constructed with readily produced standard parts simply and economically assembled.

In the drawings:

FIG. 3 is an enlarged view, in section, on line 3—3 of FIG. 1;

Figure 1:
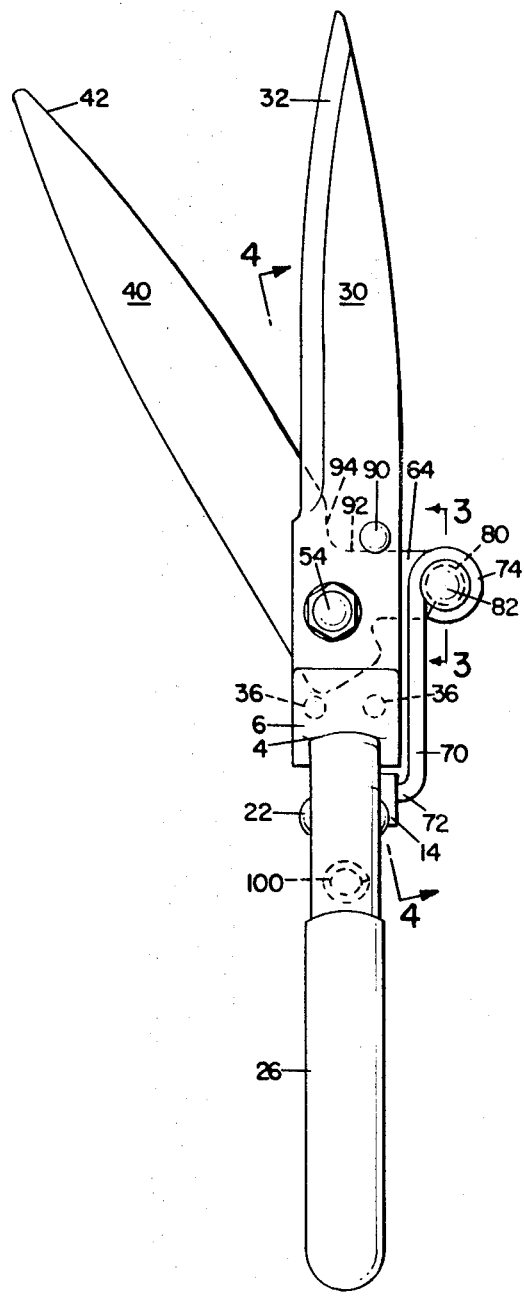
FIG. 1 is a view, in top plan, of the shears construction embodying the novel features of the invention.
Figure 2:
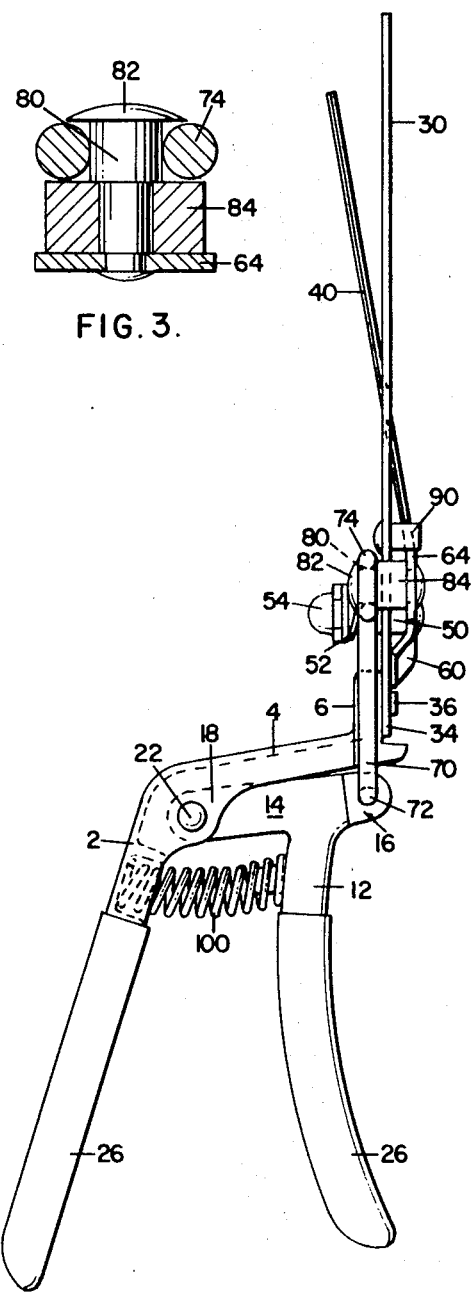
FIG. 2 is a view, in side elevation, of the shears construction shown in FIG. 1.
Figure 4:
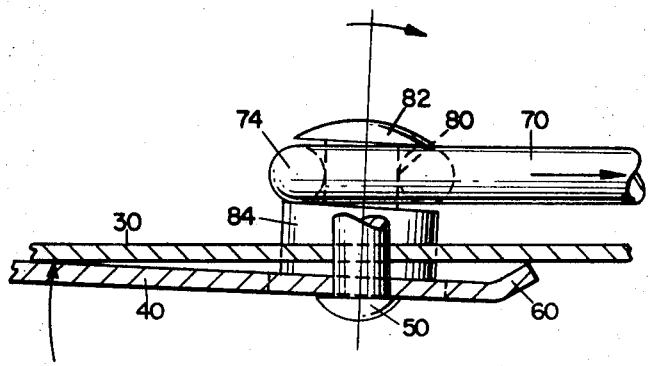
FIG. 4 is an enlarged fragmentary view, in section on line 4—4 of FIG. 1.

A frame member 2 functions as an upper handle of the shears and has a downwardly-inclined forward or inboard portion 4 and a forwardly-extending blade-supporting projection 6.

An operating member 12 functions as the lower handle of the shears and has an upstanding boss 14 at its forward or inboard end and an offset downwardly-inclined forward or inboard portion 16 projecting from one side thereof.

Frame member 2 is additionally provided with a bifurcated rearwardly-facing-thickened portion 18 serving as the locating site for a transversely-extending operating member pivot pin 22 which is receivable in aligned openings in both parts of the thickened portion and in the upper free end of upstanding boss 14 nested between said both parts.

Frame member 2 and operating member 12 may be each provided with suitable sheathing 26 sleeved therearound in the usual handle-covering manner and same may be composed of a soft or yieldable material such as rubber or plastic for the obvious reasons of ease and comfort in handling the tool.

A stationary blade 30 with an inner longitudinally-extending cutting edge 32 is provided with a rear heel portion 34 which is suitably fixed to frame member 2 as by riveting at 36 to blade-supporting projection 6. The members may be otherwise fixed together in any other well known manner in realizing the objective of providing an integral structure.

A movable blade 40 having an inner longitudinally-extending cutting edge 42 is disposed in a generally horizontally plane vertically beneath the horizontal plane of stationary blade 30 and is pivoted thereto for swinging movements relative thereto by means of a pivotal connection comprising an upstanding post or pintle 50 fixed to movable blade 40 and extendable through an appropriate slightly-enlarged opening in stationary blade 30, and a compression type spring 52 circumposed on the post upawrdly of the stationary blade and compressed by an adjustable cap nut 54 threadedly-engaged on the free upper extremity of the post. By such means, the stationary blade is urged against the movable blade, with any desired degree of tension being attainable by virtue of an adjustment of the cap nut.

The opening in the stationary blade being of somewhat larger diameter than the post defines a somewhat loose pivotal connection with the stationary blade to such extent that the movable blade is laterally and angularly cantable or tiltable with respect to the post in the performance of its cutting action cooperantly with the stationary blade.

Movable blade 40 is bowed longitudinally as is usual in the shears art.

Movable blade 40 is additionally provided with an upturned rearward or inboard heel portion 60 for fulcrumming purposes rearwardly of the pivotal connection between the blades, thereby aiding the desired canting or tilting action.

Movable blade 40 is also provided adjacent its inboard or rearward end with a unitary, coplanar, offset pivotal mount portion 64 which extends outwardly obliquely relative to and from inner cutting edge 42 and outwardly with respect to the pivotal connection of the blades, all so as to define a horizontally turnable arm as the shears are moved between shears-opening and shears-closing positions.

Boss 16 of operating member 12 has a transversely-extending opening therethrough, through which a circularly-turned or eyeletted rearward extremity 72 of an elongated pull rod 70 is inserted for insuring a locked interengagement with the operating member so that, as the operating member is motivated vertically upwardly toward frame member 2 in shears-closing direction or is motivated vertically downwardly away from the frame member in shears-opening direction, the pull rod is pulled downwardly or is pushed forwardly respectively.

Pull rod 70 extends forwardly from operating member 12 so that its forward eyeletted extremity 74 may be pivotally interconnected with an upstanding post 80 mounted on pivotal mount portion 64.

Post 80, having a headed over upper extremity 82, is circumscribed by a collar 84 upwardly of pivotal mount portion 64 so as to define a seat for the forward or outboard eyeletted end 74 of pull rod 70, the collar being of a height such as to dispose the pull rod in a plane substantially parallel to and vertically above the horizontal plane of stationary blade 30 and vertically above the plane assumed by the rearward portion of the movable blade.

A limit stop 90 is fixed to and depends vertically downwardly from stationary blade 30.

In shears-open position, an edge 92 of pivotal mount portion 64 of the movable blade abuts limit stop 90 to limit movement of the movable blade in the shears-opening direction. In shears-closed position, an edge 94 of the movable blade abuts limit stop 90 to limit movement of the movable blade in the shears-closing direction.

A helical compression spring 100 is suitably disposed between frame member 2 and operating member 12 for urging these components apart into shears-opened position, the spring being compressed as these components are moved toward each other in assuming shears-closed position.

The pivotal connection between the forward end of pull rod 70 and post 80 on pivotal mount portion 64 of movable blade 30 is disposed outwardly and transversely forwardly relative to any rearwardly-directed prolongation of cutting edge 42 of the movable blade and is disposed upwardly relative to the inclined fulcrum of the movable blade and the underside of the stationary blade.

The pulling force of the pull rod is translated to the pivotal portion on the pivotal movement of the movable blade in an upward direction.

As operating member 12 is moved toward frame member 2, pull rod 70 is actuated in manner such that an upward pulling force is applied to the movable blade, thereby to pull the cutting edge of the movable blade into positive engagement with the coacting cutting edge of the stationary blade for the desired cutting action.

In the cutting operation of the shear, the pull rod exerts a desired upward pulling force on the movable blade so that the cutting edge thereof positively engages the cooperating edge of the stationary blade according to the force applied to operating member 12 and frame member 2, all to the end that an object between the blades cannot separate them and thereby the most effective cutting and shearing action is attained.

As known, the action of a force upon a lever causes a tendency on the part of the lever to turn about its fulcrum, with the magnitude of this tendency depending, first, upon the magnitude of the force acting, and second, upon the perpendicular distance from the line of action of the force to the fulcrum. As the force is increased, or its perpendicular distance from the fulcrum is made greater, the tendency to turn the lever about its fulcrum increases. This rotating effect of a force about a fulcrum is termed "the moment of the force" and is equal to the product obtained by multiplying the force by the perpendicular distance from the fulcrum, with the force being measured in pounds and the distance in inches, the moment being measured in inch-pounds.

Figure 5:
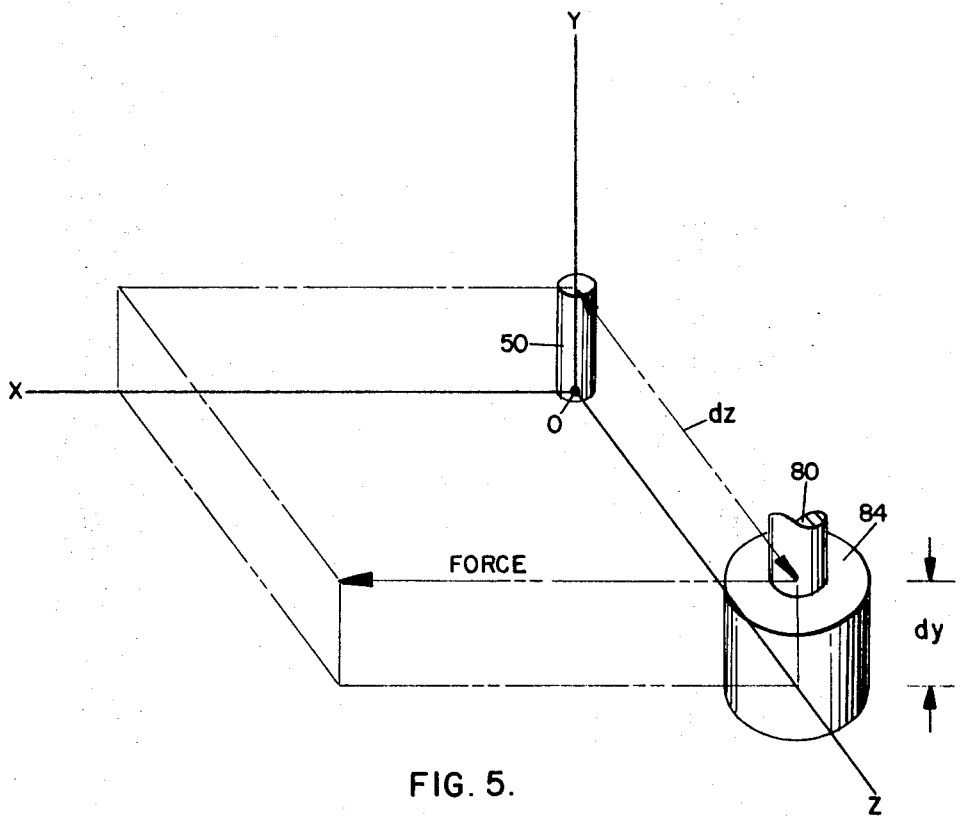
FIG. 5 is a schematic representation of the moments of force realized in the operation of the shears and serves as a dramatic illustration of the how and why of the result obtained by the invention.

In the schematic showing of FIG. 5, O represents the main pivot of the shears or the pivotal connection consisting of post 50, spring 52 and cap nut 54, whereat the movable blade is pivoted to the stationary blade, and the two motions of the movable blade, that is the horizontal movement and the vertical movement, are represented by the three axes, $x$, $y$ and $z$.

The illustrated $x$ axis represents the main axis of the movable blade in the shears-opened position, the $z$ axis represents the axis from the movable blade pivot to the pivot on pivotal mount portion 64, and the $y$ axis represents the axis along the pintle or post 80 on the pivotal mount portion.

The moment of force about the $y$ axis, is exemplified as Force $(dz)$ where $dz$ actually represents the distance between pintle 50 and post 80 or the amount the force is offset from the pivot. This force turns the movable blade about the pintle 50 in a clockwise direction as viewed from above.

The moment of force about the $z$ axis is exemplified as force $(dy)$ where $dy$ actually represents the thickness of collar 84 on post 80, or the amount the force (pull) is raised above the $xz$ plane of the movable blade. This force tends to rotate the movable blade about the $z$ axis, thus keeping it in contact with the fixed blade.

By the fact that the pull (force) is applied above the $xz$ plane, $dy$ tends to tip the movable blade upwardly against the fixed blade, thus insuring contact at the cutting point as it (the cutting point) moves outwardly along the blade.

Were the collar 84 not provided, force $dy$ would be zero, wherefore there would be no force to tip the movable blade upwardly to insure contact at the cutting point.

I claim:

1. In shears having an upper handle and a lower handle disposed vertically below and pivotally interengaged therewith and a stationary blade fixed to the upper handle and a movable blade disposed beneath the stationary blade and a pivotal connection between the stationary blades for pivoting movement of the movable blade with respect to the stationary blade between shears-opened and shears-closed position and a pull rod pivotally interengaged with the lower handle at its rearward end and the movable blade at its forward end, the improvement consisting in:
an upstanding post mounted on the movable blade,
the pivotal connection between the pull rod and the upstanding post being above the plane of both the movable and stationary blades whereby in shears-closing movement the pull rod acts with an upward pulling force relative to the cutting edge of the movable blade for pulling the cutting edge of the movable blade against the cutting edge of the stationary blade.

2. In shears, the combination of:
a unitary relatively-fixed upper handle and stationary blade,
a lower handle pivotally interengaged with the upper handle,
a movable blade disposed beneath the stationary blade,
the stationary and movable blades having inner longitudinally-extending cutting edges,
a pivotal connection between the stationary and movable blades for pivoting movement of the movable blade with respect to the stationary blade between shears-opened and shears-closed positions,
the movable blade having an offset pivotal portion extending outwardly relative to the cutting edge thereof,
an upstanding post fixed to the pivotal portion of the movable blade,
a pull rod being pivotally interconnected at its rearward end with the operating member and pivotally interconnected at its forward end with the upper extremity of the post, and
lifting means engageable with the post for locating the forward pivotal interconnection in a plane above the planes of the stationary and movable blades whereby on movement of the operating member for moving the movable blade to shears-closed position with the cutting edge of the movable blade being pulled upwardly toward and into operating engagement with the cutting edge of the stationary blade.

3. In shears, the combination of:
a unitary relatively-fixed upper handle and stationary blade,
a lower handle pivotally interengaged with the upper handle,
a movable blade disposed beneath the stationary blade,
the stationary and movable blades having inner longitudinally-extending cutting edges,
a pivotal connection between the stationary and movable blades for pivoting movement of the movable blade with respect to the stationary blade between shears-opened and shears-closed positions,
an upstanding post fixed to the movable blade,
a pull rod pivotally interconnected at its rearward end with the lower handle and pivotally interconnected at its forward end with the post,
lifting means associated with the post between the pull rod, and
the pivotal portion of the movable blade for maintaining the pivotal interconnection of the pull rod above the horizontal plane of the cutting edges of the stationary and movable blades with movement of the pull rod for moving the movable blade to shears-closed position pulling the cutting edge of the movable blade upwardly toward and into operating engagement with the cutting edge of the stationary blade.

References Cited
UNITED STATES PATENTS

| | | | |
|---|---|---|---|
| 2,864,164 | 12/1958 | Wallace | 30—248 |
| 3,296,697 | 1/1967 | Hedstrom | 30—248 |

ROBERT C. RIORDON, Primary Examiner

J. C. PETERS, Assistant Examiner